United States Patent [19]

Dirlikov et al.

[11] 4,438,226

[45] Mar. 20, 1984

[54] POLYURETHANES DERIVED FROM 1,4-LACTONES OF 3,6-ANHYDRO-2,3,4,5,6-PENTAHYDROX-YHEXANOIC ACID

[75] Inventors: Stoil K. Dirlikov; Connie J. Schneider, both of Midland, Mich.

[73] Assignee: The Dow Chemical Company, Midland, Mich.

[21] Appl. No.: 487,475

[22] Filed: Apr. 22, 1983

[51] Int. Cl.$^3$ .................... C08G 18/14; C08G 18/32; C08G 18/64

[52] U.S. Cl. .................... 521/175; 521/174; 521/905; 521/176; 528/73; 528/904; 252/182

[58] Field of Search .................... 528/73, 904; 521/174, 521/175, 176, 905; 252/182

[56] References Cited

U.S. PATENT DOCUMENTS

| | | | |
|---|---|---|---|
| 3,718,623 | 2/1973 | Lohse et al. | 260/75 |
| 3,730,936 | 5/1973 | Bugmann | 260/37 N |
| 4,065,587 | 12/1977 | Ting | 427/54 |
| 4,098,747 | 7/1978 | Bailey et al. | 260/30.4 N |
| 4,153,778 | 5/1979 | Park et al. | 528/76 |
| 4,163,094 | 7/1979 | Turpin | 528/45 |
| 4,205,138 | 5/1980 | Mueller et al. | 521/158 |
| 4,250,274 | 2/1981 | Domico et al. | 525/127 |
| 4,276,405 | 6/1981 | Koleske et al. | 528/58 |
| 4,320,171 | 3/1982 | Motz et al. | 428/423.1 |
| 4,324,280 | 4/1982 | Keibota | 152/349 |

*Primary Examiner*—H. S. Cockeram
*Attorney, Agent, or Firm*—Norman L. Sims

[57] ABSTRACT

The invention is a polyurethane comprising the reaction product of (a) a 1,4-lactone of 3,6-anhydropentahydroxyhexanoic acid; and (b) an organic polyisocyanate.

The polyurethanes of this invention are useful in coatings, compression moldings, control release systems, films, foams and the like.

17 Claims, No Drawings

POLYURETHANES DERIVED FROM 1,4-LACTONES OF 3,6-ANHYDRO-2,3,4,5,6-PENTAHYDROXYHEXANOIC ACID

BACKGROUND OF THE INVENTION

This invention relates to polyurethanes derived from 1,4-lactones of 3,6-anhydro-2,3,4,5,6-pentahydroxyhexanoic acid. The polyurethanes of this invention are useful in coatings, compression moldings, control release systems, films, foams and the like.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

The prior art active hydrogen compounds are derived from petroleum feedstocks. Such feedstocks are non-renewable resources which have become quite costly in recent years.

Active hydrogen compounds which are derived from renewable resources and which can be used in the manufacture of polyurethanes are needed.

SUMMARY OF THE INVENTION

The invention is a polyurethane comprising the reaction product of (a) a 1,4-lactone of 3,6-anhydropentahydroxyhexanoic acid; and (b) an organic polyisocyanate.

2,3,4,5,6-Pentahydroxyhexanoic acid is derived from readily renewable and relatively inexpensive resources, for example, waste sugar or cellulose. The 1,4-lactones of 3,6-anhydro-2,3,4,5,6-pentahydroxyhexanoic acid are active hydrogen compounds which are used to prepare polyurethanes.

The polyurethanes of this invention demonstrate very good thermal stability. Further, they exhibit lower flammability than prior art polyurethanes.

These polyurethanes have unique water solubility characteristics. They are initially insoluble in water, but when exposed to water over a period of time they slowly become soluble.

DETAILED DESCRIPTION OF THE INVENTION 1,4-Lactones of 3,6-anhydro-2,3,4,5,6-pentahydroxyhexanoic acid are derived from 2,3,4,5,6-pentahydroxyhexanoic acid. There are sixteen isomers of 2,3,4,5,6-pentahydroxyhexanoic acid of which only those in which one of the hydroxy groups on the 3 and 4 carbons is d while the other hydroxy group is l, are useful in preparing the 1,4-lactone of 3,6-anhydro-2,3,4,5,6-pentahydroxycaproic acid. The most common isomer is gluconic acid.

The 1,4-lactones of 3,6-anhydro-2,3,4,5,6-pentahydroxyhexanoic acid generally correspond to the formula,

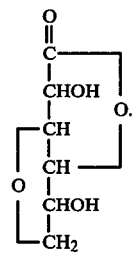

The difference between the 1,4-lactones derived from the different isomers is in the geometry of the particular 1,4-lactones. The 1,4-lactone of 3,6-anhydrogluconic acid is the most preferred 1,4-lactone because it is the most readily available.

The isocyanates useful in this invention include organic diisocyanates, for example, aliphatic diisocyanates, cycloaliphatic diisocyanates or aromatic diisocyanates; or organic polyisocyanates, for example, aliphatic polyisocyanates, cycloaliphatic polyisocyanates or aromatic polyisocyanates. As used herein organic polyisocyanates refer to organic diisocyanates, organic triisocyanates and organic polyisocyanates unless otherwise specified.

Representative of isocyanates useful in this invention are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate; the triisocyanates such as 4,4',4''-triphenylmethane triisocyanate, polymethylene polyphenylisocyanate and tolylene-2,4,6-triisocyanate; and the tetraisocyanates such as 4,4'-dimethyldiphenylmethane-2,2'-5,5'-tetraisocyanate. Especially useful due to their availability and properties are tolylene diisocyanate, diphenylmethane-4,4'-diisocyanate and hexamethylene diisocyanate.

Polyurethanes prepared using polyisocyanates which contain three or more reactive isocyanate groups per molecule, are cross-linked polymers. Polyurethanes prepared from diisocyanates are linear polymers. For this reason, diisocyanates are preferred in this invention.

The polyurethanes of this invention comprise the reaction products of (a) 1,4-lactones of 3,6-anhydro-2,3,4,5,6-pentahydroxyhexanoic acid and (b) organic polyisocyanates. The use of a wide range of mole ratios of component (a) to component (b) in these polyurethanes is within the scope of this invention. The polyurethanes preferably comprise mole ratios of (a) 1,4-lactones of 3,6-anhydro-2,3,4,5,6-pentahydroxyhexanoic acid to (b) organic polyisocyanates of between about 0.1:1.0 and 10.0:1.0.

In one embodiment wherein the polyisocyanate contains three or more reactive isocyanate groups per molecule, the molar ratio of the 1,4-lactones of 3,6-anhydro-2,3,4,5,6-pentahydroxyhexanoic acid to the polyisocyanates within the above range is not critical, as cross-linked polymers are prepared in which excess reactive groups can be present. Further the molar ratio of the two components used is dependent on the number of reactive groups in each of the monomers. It is preferable in this embodiment that the relative equivalent ratio of active hydrogen-containing groups to reactive isocyanate groups be between 3.0:1.0 and 1.0:3.0, more preferably 2.0:1.0 and 1.0:2.0 and most preferably 1.1:1.0 to 1.0:1.1. Equivalent ratio refers herein to the relative ratio of reactive hydrogen groups contained in the polyols to the reactive isocyanates contained in the polyisocyanates in the polymerization mixture. In this embodiment wherein the polymer contains excess active hydrogen groups or isocyanate groups, the polymer can further be reacted to prepare higher molecular weight polymers.

In another embodiment, organic diisocyanates are reacted with the 1,4-lactones of 3,6-anhydro-2,3,4,5,6-pentahydroxyhexanoic acid to prepare linear polyurethanes. In this embodiment the molar ratios of the 1,4-lactones of 3,6-anhydro-2,3,4,5,6-pentahydroxyhexanoic acid to diisocyanates is more preferably between about 1.1:1.0 and 1.0:1.1, even more preferably between 1.05:1.0 and 1.0:1.05 and most preferably about 1.0:1.0. In order to prepare high molecular weight linear polyurethanes, the reactants should be reacted in substantially stoichiometric amounts. Where a significant excess of one or the other of the reactants is used, short chain oligomers and prepolymers are prepared which can be further polymerized to prepare higher molecular weight polymers.

In one embodiment, the polyurethanes of this invention include those which correspond to the formula,

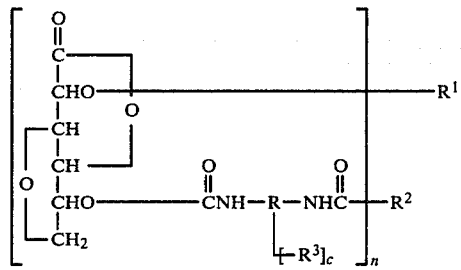

wherein
R is a 2+c valent hydrocarbyl radical;
$R^1$ is H or

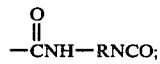

$R^2$ is

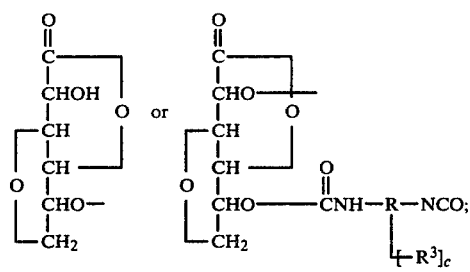

$R^3$ is separately in each occurrence —N=C=O or

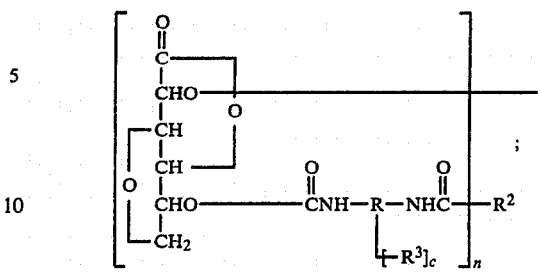

c is between about 0 and 8; and
n is between about 1 and 50,000.

R can be a 2+c valent aliphatic, cycloaliphatic or aromatic radical. Specific examples of R are described hereinbefore in the examples of isocyanates which may be used in this invention.

Preferably, c is 0, 1 or 2, more preferably 0 or 1 and most preferably 0. Wherein c is 1 or greater, the product is a cross-linked polymer. Wherein c is 0, the product is a linear polymer.

n is preferably 1 to 1,000.

$R^1$ and $R^2$ are the terminating groups of the polyurethane. The nature of the terminating groups is determined by the relative ratio of reactive hydrogen groups to isocyanate groups.

In one preferred embodiment, the polyurethanes comprise (a) a 1,4-lactone of 3,6-anhydrogluconic acid and (b) an organic diisocyanate. Such polyurethanes are soluble in polar solvents such as dimethyl acetamide, dimethyl sulfoxide and dimethylformamide, but insoluble in nonpolar solvents such as trichloromethane and tetrachloromethane.

The polymers are initially insoluble in water. Upon exposure to water, the lactone rings slowly undergo hydrolysis and the rings open. As the lactone rings open up, the polymers become more soluble in water. The polyurethanes with opened lactone rings contain reactive hydroxyl groups which can be used to cross-link the polyurethanes. These solubility characteristics in water render these polyurethanes useful in controlled release applications. This ring opening is accelerated by the presence of acid.

The polyurethanes described herein can be prepared by methods well-known to those skilled in the art for the preparation of polyurethanes. Such methods are described in *Polyurethanes: Chemistry and Technology I. Chemistry,* Saunders and Frisch, Interscience (1962), incorporated herein by reference. Melt, solution or emulsion polymerizations and the like may be used for such preparations. Polyurethane catalysts well-known in the art can optionally be used in the preparation of these compounds.

Any suitable urethane catalyst may be used including tertiary amines such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylenediamine, N,N-diethyl-3-diethylaminopropylamine, dimethyl benzylamine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

Desirable temperatures for these polymerizations include between about 20° C. and 150° C., preferably between about 20° C. and 110° C.

It is desirable to prepare these polyurethanes in an inert atmosphere as moisture reacts with isocyanates to prepare unwanted by-products.

In addition to components (a) and (b), the polyurethanes prepared can further comprise chain-extending agents. Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water, such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

In another embodiment, the polyurethanes comprise the reaction product of a polyisocyanate, a 1,4-lactone of 3,6-anhydro-2,3,4,5,6-pentahydroxyhexanoic acid, and a polyahl. In this embodiment, the active hydrogen compounds reacted with the polyisocyanate to prepare the polyurethanes comprises a mixture of a polyahl and a 1,4-lactone of 3,6-anhydro-2,3,4,5,6-pentahydroxyhexanoic acid.

In this embodiment, the molar ratio of the 1,4-lactone of 3,6-anhydro-2,3,4,5,6-pentahydroxyhexanoic acid and the polyahl mixture to the polyisocyanate is between about 10.0:1.0 and 1.0:10.0. Further, the molar ratio of the 1,4-lactone of 3,6-anhydro-2,3,4,5,6-pentahydroxyhexanoic acid to the polyahl is between about 100.0:1.0 and 1.0:100.0, preferably between about 10.0:1.0 and 1.0:10.0.

In a preferred embodiment, the polyurethane comprises the reaction product of
(a) the 1,4-lactone of 3,6-anhydrogluconic acid;
(b) a polyahl; and
(c) an organic diisocyanate.

In this embodiment, the molar ratio of components (a) and (b) to component (c) is more preferably between about 1.1:1.0 and 1.0:1.1, even more preferably between about 1.05:1.0 and 1.0:1.05, most preferably 1.0:1.0.

Polyahls suitably employed in this invention include any organic compound having at least two active hydrogen moieties wherein the compound has a number average molecular weight ($M_n$) of at least 62. For the purposes of this invention, an active hydrogen moiety refers to a moiety containing a hydrogen atom which, because of its position in the molecule, displays significant activity according to the Zerewitnoff test described by Woller in the *Journal of the American Chemical Society*, Vol. 49, p. 3181 (1927). Illustrative of such active hydrogen moieties are —COOH, —OH, —NH$_2$, =NH, —CONH$_2$, —SH and —CONH—. Typical polyahls include polyols, polyamines, polyamides, polymercaptans, polyacids and the like, particularly as exemplified in U.S. Pat. No. 3,928,299.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed in *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Shick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

The polyurethanes of this invention can be used to prepare films, foams, moldable compositions, coatings and the like. Methods of such preparation are well-known to those skilled in the art, see *Polyurethanes:*

*Chemistry and Technology II. Technology,* Saunders and Frish, Interscience (1964).

The 1,4-lactones of 3,6-anhydro-2,3,4,5,6-pentahydroxyhexanoic acids are prepared by refluxing the 1,4- or 1,5-lactone of 2,3,4,5,6-pentahydroxyhexanoic acid in an organic solvent, such as toluene with azeotropic separation of water, in the presence of an ion-exchange resin, a quaternary ammonium compound or a quaternary phosphonium compound.

SPECIFIC EMBODIMENTS

The following examples are included for illustrative purposes only and do not limit the scope of the invention.

EXAMPLE 1

Hexamethylene diisocyanate (HMDI) is purified prior to use by vacuum distillation. 1,4-Lactone of 3,6-anhydrogluconic acid (LAGA) is purified by vacuum distillation then recrystallized from ethyl acetate (10 g in 250 ml). The crystals obtained are dried in vacuum over phosphorus pentoxide (m.p. 117° C.). N,N-Dimethyl acetamide (DMAc) is stored over molecular sieve 3A and used without further purification. Dibutyltin dilaurate is used without further purification.

The polymerization is carried out in a nitrogen atmosphere in a 250-ml four-necked flask equipped with a dropping funnel, reflux condenser, mechanical stirrer and nitrogen inlet tube.

HMDI (16.82 g, 0.1 mole) is added dropwise at room temperature from the dropping funnel into the rapidly stirred solution of 16.01 g (0.1 mole) of LAGA in 100 ml of dimethyl acetamide. After the addition is completed, 0.2 ml of dibutyltin dilaurate is added as a catalyst and the polymerization is carried out at 75° C. for 24 hours. A very viscous, completely transparent solution is obtained. It is cooled to room temperature, diluted with 100 ml of DMAc and precipitated by dropwise addition into 2 liters of chloroform. The suspension is left for about 16 hours, filtered, washed with chloroform and dried in vacuum at 25° C. A white powder of a polyurethane prepared from LAGA and HMDI is obtained with 100 percent yield. The polymer prepared melts at 150° C., its degradation starts at 240° C. and its $T_g$ was observed at 85° C.

EXAMPLE 2

Methylenediphenylene diisocyanate (MDI) is purified prior to use by vacuum distillation. LAGA is purified by vacuum distillation and then recrystallized from ethyl acetate (10 g in 250 ml). The crystals obtained are dried in vacuum over phosphorus pentoxide (m.p. 117° C.). DMAc is stored over molecular sieve 3A and used without further purification.

The polymerization is carried out in a nitrogen atmosphere in a 250-ml four-necked flask equipped with a reflux condenser, mechanical stirrer and nitrogen inlet tube. MDI (2.50 g, 0.01 mole) is added at room temperature to the rapidly stirred solution of 1.60 g (0.01 mole) of LAGA in 80 ml of DMAc. The polymerization is carried out without a catalyst at 20° C. for 24 hours. The temperature is then increased to 110° C. for 1.5 hours. The viscous, completely transparent solution is cooled to room temperature and added dropwise into 1.5 liters of chloroform precipitating the product. The suspension is left for about 16 hours, filtered, washed with chloroform and dried in vacuum at 25° C. A white powder of a polyurethane prepared from LAGA and MDI is obtained with 100 percent yield. The polyurethane begins degradation at 240° C., no $T_g$ was observed below this temperature.

What is claimed is:

1. A polyurethane comprising the reaction product of
   (a) a 1,4-lactone of 3,6-anhydropentahydroxyhexanoic acid; and
   (b) an organic polyisocyanate.

2. A polyurethane comprising the reaction product of
   (a) a 1,4-lactone of 3,6-anhydrogluconic acid; and
   (b) an organic polyisocyanate.

3. The polyurethane of claim 2 wherein the mole ratio of (a) the 1,4-lactone of 3,6-anhydrogluconic acid to (b) organic polyisocyanate is between about 0.1:1.0 and 10.0:1.0.

4. The polyurethane of claim 2 which comprises the reaction product of (a) a 1,4-lactone of 3,6-anhydrogluconic acid and (b) an organic diisocyanate.

5. The polyurethane of claim 4 wherein the mole ratio of (a) the 1,4-lactone of 3,6-anhydrogluconic acid to (b) the organic diisocyanate is between about 1.05:1 and 0.95:1.

6. The polyurethane of claim 4 wherein the organic diisocyanate is an aliphatic diisocyanate, cycloaliphatic diisocyanate or an aromatic diisocyanate.

7. A polyurethane which corresponds to the formula,

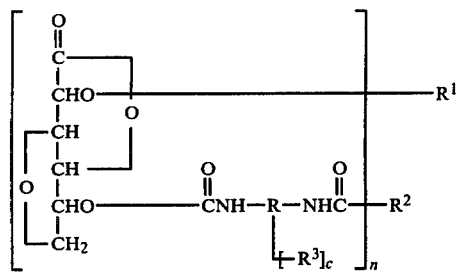

wherein
R is a 2+c valent hydrocarbyl radical;
$R^1$ is H or

$R^2$ is

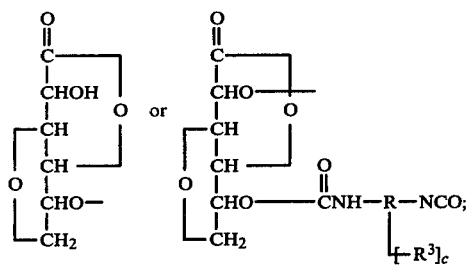

$R^3$ is separately in each occurrence —N=C=O or

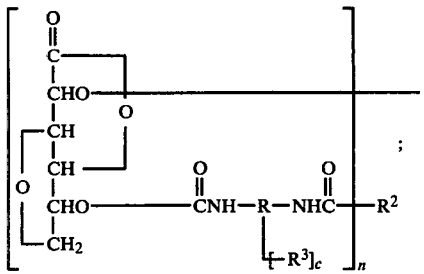

c is between about 0 and 8; and n is between about 1 and 50,000.

8. The polyurethane of claim 7 wherein n is between 1 and 1000.

9. The polyurethane of claim 7 wherein c is 0, 1 or 2.

10. The polyurethane of claim 9 wherein c is 0.

11. The polyurethane composition of claim 2 wherein the lactone rings are completely or partially hydrolyzed.

12. The polyurethane composition of claim 11 wherein the lactone rings are completely hydrolyzed.

13. A polyurethane composition comprising the reaction product of
 (a) a 1,4-lactone of 3,6-anhydro-2,3,4,5,6-pentahydroxyhexanoic acid;
 (b) a polyahl; and
 (c) an organic polyisocyanate.

14. The polyurethane of claim 13 wherein (a) is a 1,4-lactone of 3,6-anhydrogluconic acid, (b) is a polyahl and (c) is an organic diisocyanate.

15. The composition of claim 14 wherein the molar ratio of (a) and (b) to (c) is between about 10.0:1.0 and 1.0:10.0.

16. The composition of claim 15 wherein the molar ratio is between about 1.1:1.0 and 1.0:1.1.

17. The composition of claim 15 wherein the molar ratio is between about 1.05:1.0 and 1.0:1.05.

* * * * *